(12) United States Patent
Gunda et al.

(10) Patent No.: US 12,422,987 B2
(45) Date of Patent: Sep. 23, 2025

(54) PORTIONED ERASE OPERATION FOR A MEMORY SYSTEM

(71) Applicant: Micron Technology, Inc., Boise, ID (US)

(72) Inventors: Sridhar Prudviraj Gunda, Bangalore (IN); Amiya Banerjee, Bangalore (IN); Ritesh Tiwari, Bangalore (IN); Shreesha Prabhu, Singapore (SG)

(73) Assignee: Micron Technology, Inc., Boise, ID (US)

( * ) Notice: Subject to any disclaimer, the term of this patent is extended or adjusted under 35 U.S.C. 154(b) by 36 days.

(21) Appl. No.: 18/504,992

(22) Filed: Nov. 8, 2023

(65) Prior Publication Data

US 2024/0176491 A1 May 30, 2024

Related U.S. Application Data

(60) Provisional application No. 63/385,474, filed on Nov. 30, 2022.

(51) Int. Cl.
*G06F 3/06* (2006.01)
*G06F 12/02* (2006.01)

(52) U.S. Cl.
CPC .......... *G06F 3/0611* (2013.01); *G06F 3/0656* (2013.01); *G06F 3/0659* (2013.01); *G06F 3/0673* (2013.01); *G06F 12/0246* (2013.01); *G06F 2212/7205* (2013.01)

(58) Field of Classification Search
CPC .... G06F 3/0611; G06F 3/0656; G06F 3/0659; G06F 3/0673; G06F 12/0246; G06F 2212/7205
See application file for complete search history.

(56) References Cited

U.S. PATENT DOCUMENTS

| | | | | |
|---|---|---|---|---|
| 2001/0004326 | A1* | 6/2001 | Terasaki | G11C 29/16 257/679 |
| 2007/0245067 | A1* | 10/2007 | Yero | G06F 12/0246 711/E12.008 |
| 2012/0254515 | A1* | 10/2012 | Melik-Martirosian | G06F 12/0246 711/E12.008 |
| 2015/0277795 | A1* | 10/2015 | Choi | G06F 3/0616 711/103 |

* cited by examiner

*Primary Examiner* — Larry T Mackall
(74) *Attorney, Agent, or Firm* — Holland & Hart LLP

(57) ABSTRACT

Methods, systems, and devices for an erase operation for a memory system are described. The memory system may perform, on a block of memory cells, a first portion of an erase operation. After performing the first portion of the erase operation, the memory system may receive a write command to write data to the block of memory cells. In response to receiving the write command, the memory system may determine whether a threshold voltage of the block of memory cells satisfies a threshold. In response to determining the that the threshold voltage satisfies the threshold, the memory system may perform a second portion of the erase operation on the block of memory cells. As such, the memory system may write the data to the block of memory cells in response to performing the second portion of the erase operation.

20 Claims, 6 Drawing Sheets

PORTIONED ERASE OPERATION FOR A MEMORY SYSTEM

CROSS REFERENCE

The present Application for Patent claims priority to U.S. Patent Application No. 63/385,474 by Gunda et al., entitled "ERASE OPERATION FOR A MEMORY SYSTEM," filed Nov. 30, 2022, which is assigned to the assignee hereof, and which is expressly incorporated by reference herein.

FIELD OF TECHNOLOGY

The following relates to one or more systems for memory, including an erase operation for a memory system.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
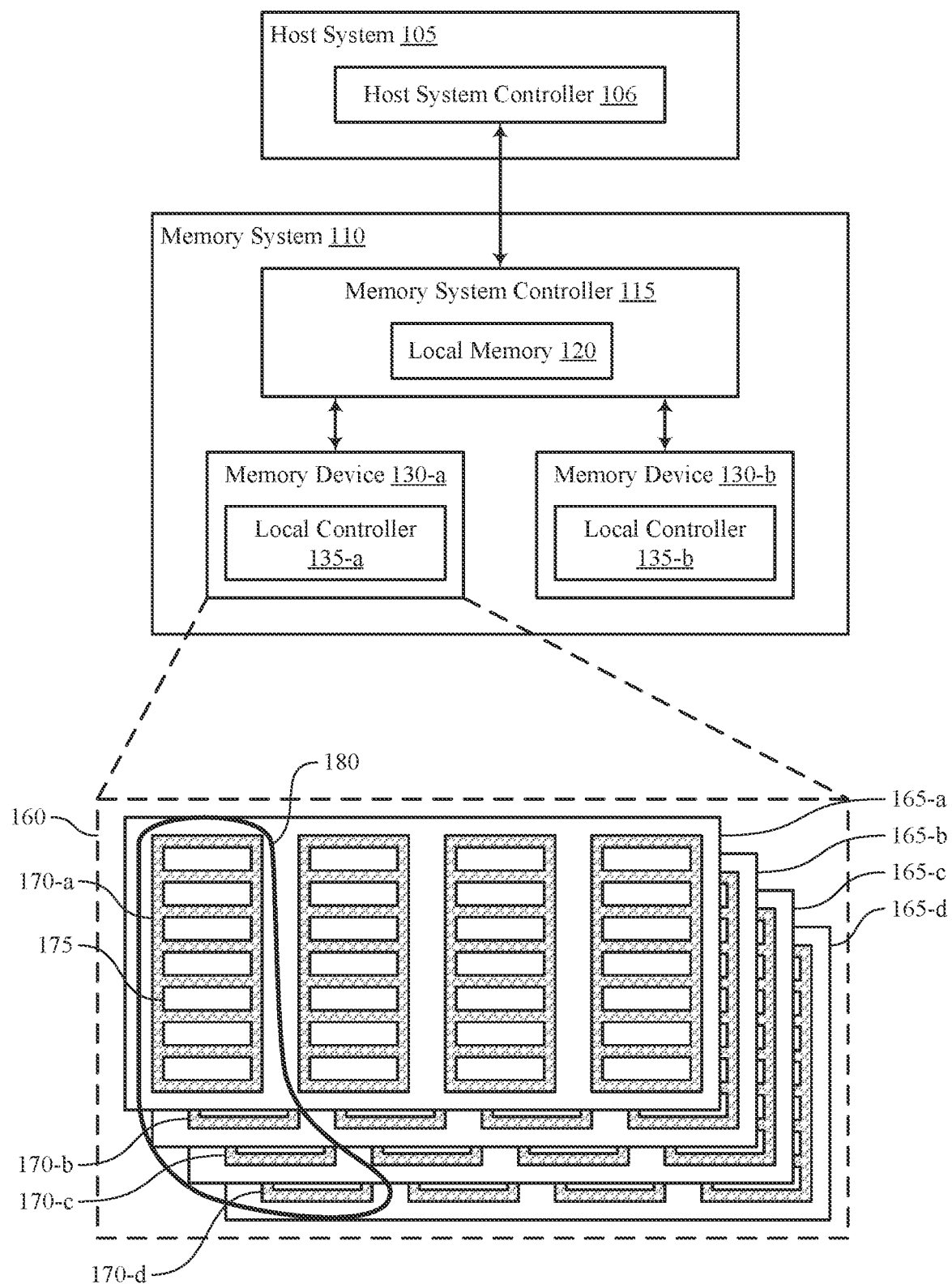
FIG. 1 illustrates an example of a system that supports an erase operation for a memory system in accordance with examples as disclosed herein.

Before performing a write operation, a memory system may erase one or more blocks of memory cells, such that the one or more blocks may be available to store data associated with the write operation. In some examples, the memory system may use a pre-erase scheme in which blocks may be proactively erased during background operations. However, using a pre-erase scheme may lead to one or more blocks being maintained in an erased state for a duration of time. As the duration between the pre-erase operation and a write operation increases, memory cells of the blocks may gain or lose electrons resulting in a threshold voltage shift, subsequently decreasing a read window budget (RWB) associated with the block of memory cells. In some examples, decreasing the RWB may decrease the separation between voltage values that represent distinct logic states.

To mitigate the decrease in RWB, the memory system may perform an additional erase operation on a block, which may lower the endurance of the block of memory cells. Additionally, or alternatively, the memory system may perform a deep erase during the pre-erase operation, which may use a higher voltage to further-shift the voltages of the cells to preemptively account for the decrease in RWB. However, the higher voltage associated with the deep erase operation may also lower the endurance of the block of memory cells. Accordingly a memory system that proactively performs erase operations on blocks of memory cells while mitigating effects on the blocks' endurance may be desirable.

A memory system configured to proactively perform erase operations on blocks of memory cells while mitigating effects on the blocks' endurance is described herein. For example, the memory system may mitigate a decrease in RWB and increase the endurance for a block of memory cells by performing a partial erase operation during background operations. In some examples, the memory system may perform a first portion of an erase operation in anticipation of receiving a write command and may perform a second portion of the erase operation in response to receiving the write command.

For instance, an erase operation may include a set of erase cycles (e.g., N cycles) where each erase cycle may apply a voltage pulse to the block of memory cells. As such, the first portion of the erase operation may include a first subset of erase cycles (e.g., N−1 cycles) that occur during background operations. In response to receiving a write command, the memory system may perform a count fail byte (CFByte) check to determine the threshold voltage of the block of memory cells. In response to the CFByte result, the memory system may configure an erase voltage pulse for the second portion of the erase operation, such that the erase voltage pulse may erase the remaining contents of the block of memory cells. In response to completing the second portion of the erase operation, the memory system may perform a write operation associated with the received write command. Performing a partial erase operation in the background may improve the endurance of the memory system and may mitigate latency that would otherwise be part of performing the write operation requested by a host system.

Features of the disclosure are initially described in the context of systems with reference to FIGS. 1 through 3A. Features of the disclosure are described in the context of a voltage diagram and a process flow with reference to FIGS. 3B and 4. These and other features of the disclosure are further illustrated by and described in the context of an apparatus diagram and flowchart that relate to an erase operation for a memory system with reference to FIGS. 5 and 6.

FIG. 1 illustrates an example of a system 100 that supports an erase operation for a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0"; of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases. NAND memory cells may be erased before they can be re written with new data. Thus, for example, a used page 175 may, in some cases, not be updated until the entire block 170 that includes the page 175 has been erased.

The system 100 may include any quantity of non-transitory computer readable media that support an erase operation for a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 100), by the memory system 110 (e.g., by a memory system controller 115), or by a memory device 130 (e.g., by a local controller 135), may cause the host system 105, the memory system 110, or the memory device 130 to perform associated functions as described herein.

In some examples, the memory system 110 may mitigate a decrease in RWB and increase the endurance for blocks 170 by performing a partial erase operation in the background. For example, the memory system 110 may perform a first portion of an erase operation in preparation of receiving a write command from the host system 105 and perform a second portion of the erase operation in response to receiving the write command. For instance, an erase operation may include a set of erase cycles (e.g., N cycles) where each erase cycle may apply a voltage pulse to one or more blocks 170. As such, the first portion of the erase operation may include a first subset of erase cycles (e.g., N−1 cycles) that occur during background operations.

In response to receiving a write command from the host system 105, the memory system 110 may perform a CFByte check to determine the threshold voltage of a block 170. In response to the CFByte result, the memory system 110 may configure an erase voltage pulse for the second portion of the erase operation, such that the erase voltage pulse may erase the remaining contents of the block 170. In response to completing the second portion of the erase operation, the memory system 110 may perform a write operation associated with the received write command. Performing a partial erase operation in the background may improve the endurance of the memory system 110 and may mitigate latency that would otherwise be added to the write operation.

Figure 2:
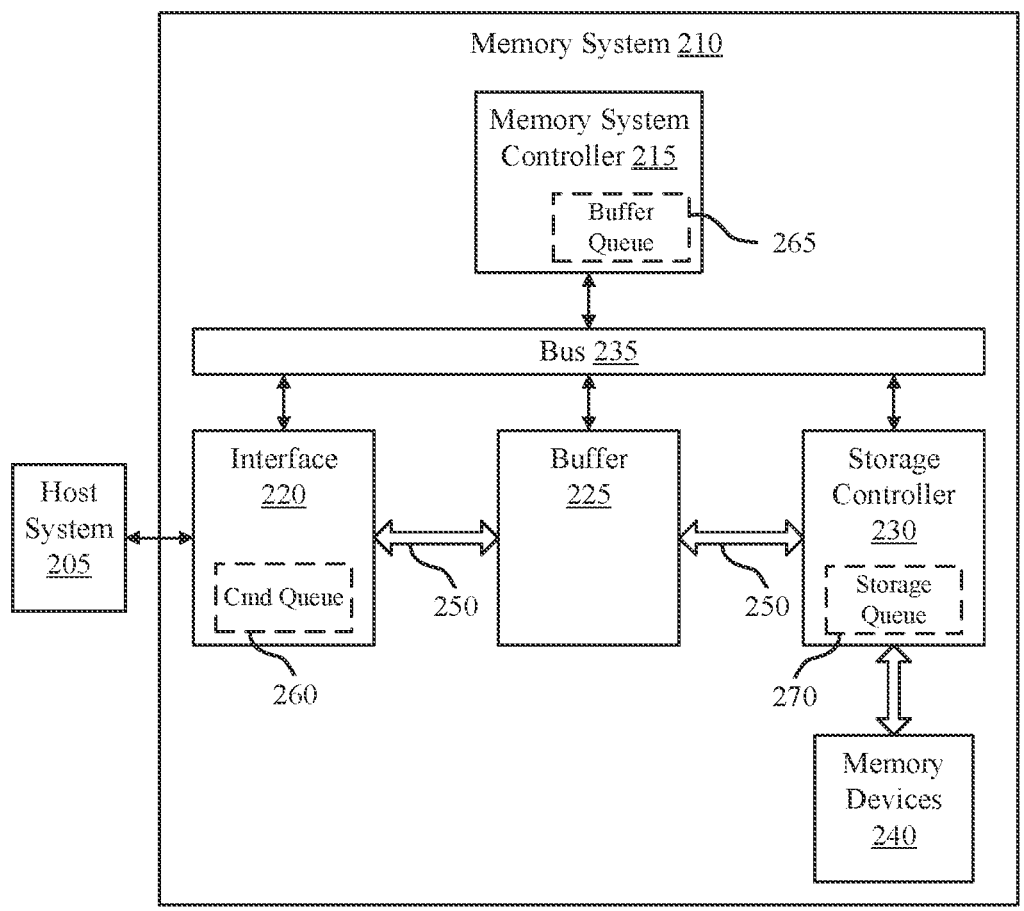
FIG. 2 illustrates an example of a system that supports an erase operation for a memory system in accordance with examples as disclosed herein.

FIG. 2 illustrates an example of a system 200 that supports an erase operation for a memory system in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 200, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received in response to the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) in response to the data transfer to the buffer 225 being completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some examples, the memory system 210 may mitigate a decrease in RWB and increase the endurance for a block of memory cells by performing a partial erase operation in the background. For example, the memory system 210 may perform a first portion of an erase operation in preparation of receiving a write command and perform a second portion of the erase operation in response to receiving the write command. For instance, an erase operation may include a set of erase cycles (e.g., N cycles) where each erase cycle may apply a voltage pulse to a block of memory cells. As such, the first portion of the erase operation may include a first subset of erase cycles (e.g., N−1 cycles) that occur during background operations.

In response to receiving a write command from the host system 105, the memory system 110 may perform a CFByte check to determine the threshold voltage of the block of memory cells. In response to the CFByte result, the memory system 210 may configure an erase voltage pulse for the second portion of the erase operation, such that the erase voltage pulse may erase the remaining contents of the block memory cells. In response to completing the second portion of the erase operation, the memory system 210 may perform a write operation associated with the received write command. Performing a partial erase operation in the background may improve the endurance of the memory system 210 and may mitigate latency that would otherwise be added to the write operation.

Figure 3A:
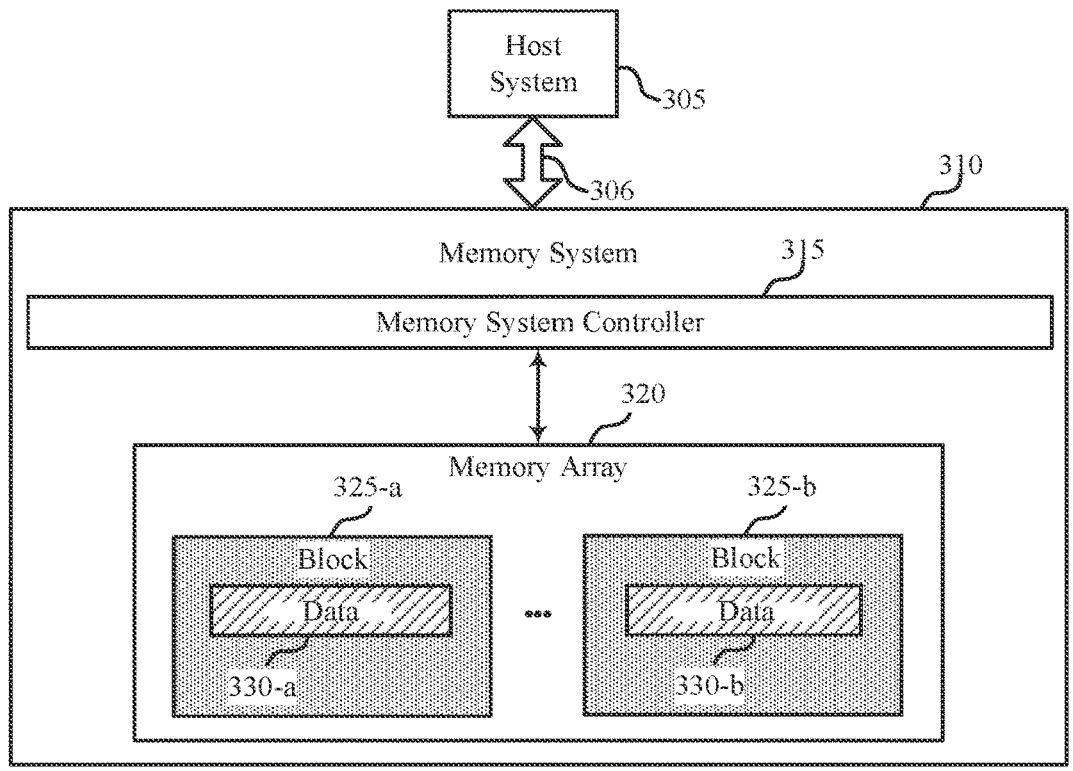
FIGS. 3A and 3B illustrate respective an example of a system and a voltage diagram that support an erase operation for a memory system in accordance with examples as disclosed herein.
Figure 3B:
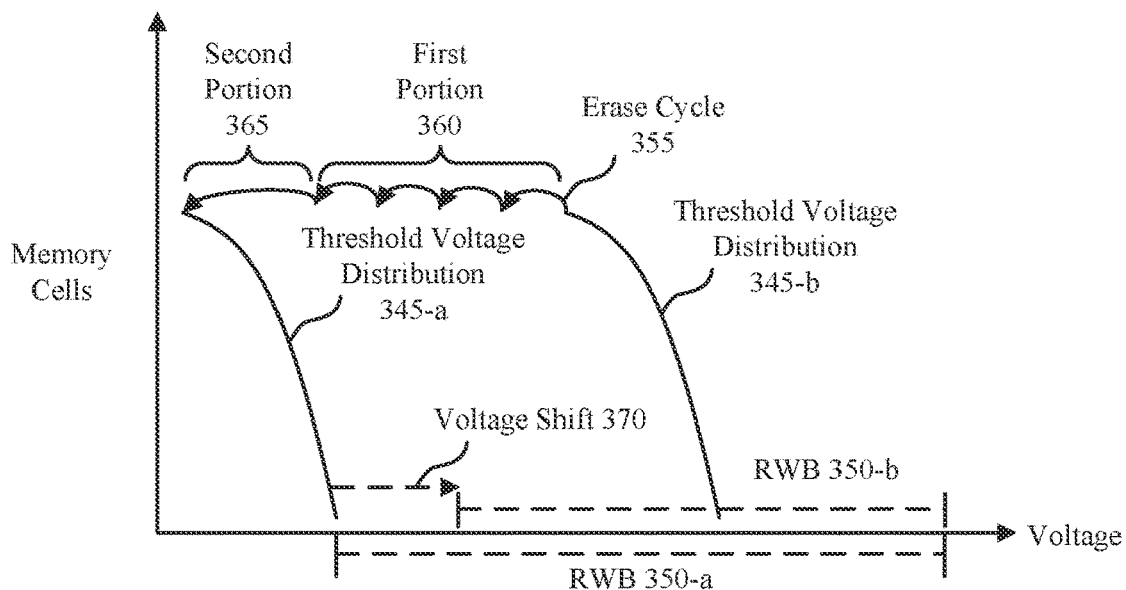

FIGS. 3A and 3B illustrate respective examples of a system 301 and a voltage diagram 302 that support an erase operation for a memory system in accordance with examples as disclosed herein. The system 301 may include a host system 305 and a memory system 310. In some cases, the host system 305 and the memory system 310 may represent a host system 105 or 205 and a memory system 110 or 210, respectively, as described with reference to FIG. 1 and FIG. 2. In some examples, the host system 305 may be coupled with the memory system 310 via an interface 306. The memory system 310 may be configured to perform a partial erase operation during background operations, which may improve memory cell endurance for the memory system 310.

The memory system 310 may include a memory array 320 that includes one or more blocks 325 of non-volatile memory cells. For example, the memory array 320 may include at least a block 325-a, a block 325-b, and any quantity of intervening blocks 325 in between. In some instances, the blocks 325 may represent physical blocks 325 of memory cells. For example, the memory cells of block 325-a may include memory cells storing one bit of data (e.g., one or more SLCs), two bits of data (e.g., one or more MLCs), three bits of data (e.g., one or more TLCs), or four bits of data (e.g., one or more QLCs). Additionally, the memory cells of block 325-b may include the same or similar memory cells (e.g., memory cells storing one or more bits of data 330). Each of the blocks 325 may store respective data 330. For example, the block 325-a may store data 330-a and the block 325-b may store data 330-b.

In some cases, the memory system controller 315 may be coupled with the memory array 320. Accordingly, the memory system controller 315 may perform various types of access operations on the blocks 325 of the memory array 320. For example, memory system controller 315 may perform an erase operation on the memory cells of block 325-a. Each block 325 may have a respective threshold voltage, where the threshold voltage for a given block 325 may be a gate-to-source voltage used to create conducting path between a voltage source and a drain terminal of the given memory cells of the block 325. In some examples, the memory system 310 may be designed to operate memory cells that have threshold voltages within a particular range (e.g., threshold voltage distribution 345). As such, the memory system 310 may perform the erase operation to shift the threshold voltage distribution 345 to erase data 330 stored at the block 325-*a*. I In some examples, the memory system 310 may use a pre-erase scheme where blocks 325 may be proactively erased during background operations of the memory system 310 to prepare the blocks 325 for a write operation. Using a pre-erase scheme may decrease a time to perform a write operation. However, using the pre-erase scheme may lead to one or more blocks 325 being erased and remaining idle for a duration of time. As the duration between the pre-erase operation and a write operation increases, memory cells of the blocks 325 may gain or lose electrons resulting in a voltage shift 370. For example, with reference to FIG. 3B, a pre-erase operation may shift the memory cells from threshold voltage distribution 345-*b* to threshold voltage distribution 345-*a*, where the threshold voltage distribution 345-*a* may be associated with RWB 350-*a*. As the memory cells remain idle, however, the memory cells may experience voltage shift 370, which may decrease the associated RWB 350 (e.g., shift from RWB 350-*a* to RWB 350-*b*). In some examples, the RWB 350 may be or may refer to a separation between voltage values that represent distinct logic states of the memory cells. For instance if a given memory cell is a TLC, the RWB 350 may hold 8 charges states which may correspond to 8 respective threshold voltages that map to three bits per cell (e.g., 000, 001, 010, . . . , 111). As such, as the RWB 350 decreases, the difference between the voltage values stored by the respective memory cells, which may introduce noise and a quantity of errors in the data 330 stored at block 325-*a*.

To mitigate the decrease in RWB 350, the memory system 310 may perform an additional erase after the idle duration to shift the memory cells back to the threshold voltage distribution 345-*a*. However, performing an additional erase operation may lower the endurance of the memory cells. Additionally, or alternatively, the memory system 310 may perform a deep erase during a pre-erase operation. For example, the memory system 310 may apply a voltage to shift the memory cells left of the threshold voltage distribution 345-*a* to preemptively account for the voltage shift 370. However, the higher voltage associated with the deep erase operation may also lower the endurance of the block 325 of memory cells.

The memory system 310 may both mitigate a decrease in RWB 350 and increase the endurance of memory cells by performing the erase operation in accordance with the operations illustrated in FIG. 3B. For example, the erase operation may include a quantity of erase cycles 355 (e.g., N cycles), where each erase cycle 355 performs a partial erase on the set of memory cells. In some cases, an erase cycle 355 (e.g., a single erase cycle 355) may include a voltage pulse applied to the set of memory cells, where each voltage pulse may have a respective pulse amplitude (e.g., the voltage differential applied across the set of memory cells) and a pulse width (e.g., a burst length or duration of time that the pulse lasts).

As such, the memory system 310 may perform a first portion 360 of the erase operation, where the first portion 360 may include a first subset of the quantity of erase cycles 355. In some examples, the quantity of erase cycles 355 (e.g., N erase cycles) for the erase operation may be configured at the memory system 310. Additionally, or alternatively, the quantity of erase cycles 355 may be configured in accordance with the type of memory cell (e.g., SLCs, MLCs, TLCs, and QLCs may have a respective N-value in accordance with performing the erase operation). In some examples, the first subset of erase cycles applied during the first portion 360, may include N−1 cycles. For instance, if the memory system 310 is configured to perform five erase cycles 355 for the erase operation, the memory system 310 may perform four erase cycles 355 during the first portion 360. In some examples, the memory system 310 may perform the first portion 360 during background operations of the memory system 310. For example, a background operation may be associated with an idle duration of the memory system 310 (e.g., activity at the memory system 310 is below a configured threshold). In some examples, each pulse of the first subset of erase cycles may have a same pulse amplitude and pulse width. Additionally, or alternatively, the pulse amplitude and pulse width configured for the first subset of erase cycles 355 may be configured in accordance with the type of memory cell (e.g., SLCs, MLCs, TLCs, and QLCs may have a respective configured pulse amplitudes and pulse widths for the first subset of erase cycles 355).

In response to performing the first portion 360, the memory cells may be partially erased. The memory system 310 may perform the first portion 360 before receiving a write command from the host system 305. In some examples, the memory system controller 315 may receive one or more write commands from the host system 305. The write commands may indicate to write data 330 to the partially erased memory cells of block 325-*a*. In response to receiving the one or more write commands, the memory system 310 may perform a CFByte check on block 325-*a*. For example, the memory system 310 may determine the resting threshold voltage after voltage shift 370 of the block 325-*a* and compare the threshold voltage to a threshold. If the resting threshold voltage of block 325-*a* fails to satisfy the configured threshold (e.g., if the threshold voltage is below the threshold), then the voltage shift 370 may have been relatively small. Based on the voltage shift 370 being relatively small, the RWB for the block 325-*a* may be large enough to reliably read the data 330-*a* stored to the block 325-*a*. As such, the memory system 310 may refrain from performing a second portion 365 of the erase operation.

If the threshold voltage of block 325-*a* satisfies the configured threshold (e.g., if the threshold voltage is above the threshold), then the voltage shift 370 may have been relatively large. As such, the memory system 310 may perform the second portion 365 of the erase operation. For example, if the configured threshold is satisfied, the memory system 310 may perform a second subset of the quantity of erase cycles 355. The second subset of erase cycles may include a last erase voltage pulse (e.g., the last erase cycle 355 of the N cycles configured). In some examples, the memory system 310 may configure the pulse width and pulse amplitude of the last erase voltage pulse in response to determining the threshold voltage. For instance, the current threshold voltage distribution 345 may be between threshold voltage distribution 345-*a* and 345-*b*. As such, the memory system 310 may configure the last erase voltage pulse to shift the memory cells to the location of threshold voltage distribution 345-*a*. In some examples, the pulse width of the last erase voltage pulse may be less than the pulse width for the first subset of erase cycles, which may increase the duration of the erase operation performed during background operations.

In response to performing the second portion 365, the memory cells may be erased (e.g., fully erased). As such, the memory system controller 315 may perform one or more write operations on the memory cells in accordance with receiving the one or more write commands from the host system 305. Performing the first portion 360 in the background may decrease the latency associated with performing write operations. Additionally, or alternatively, performing the second portion 365 in response to receiving the write operation may decrease the frequency of erase operations, which may increase the endurance of the memory cells of the memory system 310.

Figure 4:
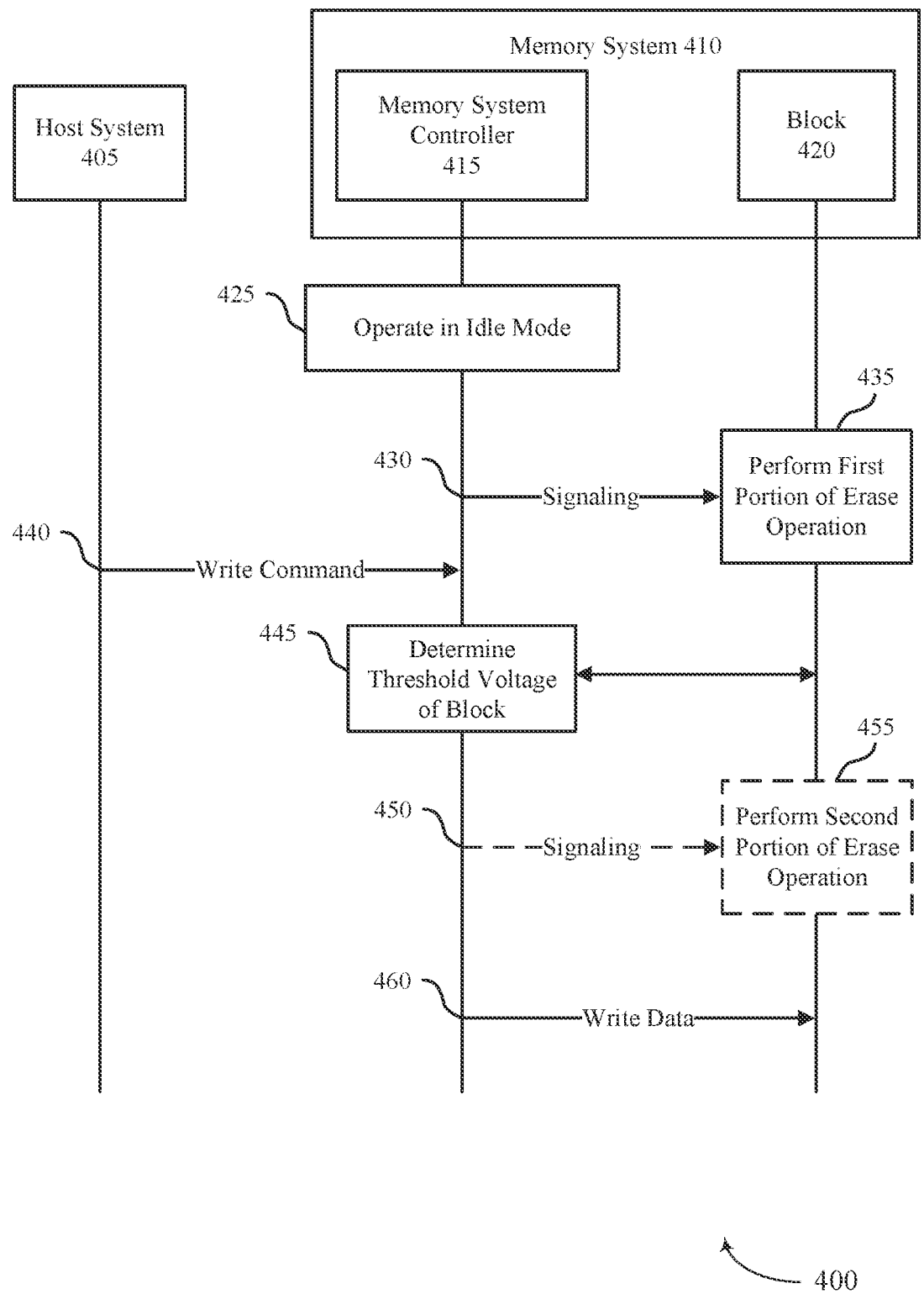
FIG. 4 illustrates an example of a process flow that supports an erase operation for a memory system in accordance with examples as disclosed herein.

FIG. 4 illustrates an example of a process flow 400 that supports an erase operation for a memory system in accordance with examples as disclosed herein. In some examples, process flow 400 may be implemented by one or more aspects of systems 100 through 300. For instance, process flow 400 may include a host system 405, which may be an example of host system 105, 205, or 305 as described with reference to FIGS. 1-3. Additionally, or alternatively, a memory system 410 may be an example of a memory system 110, 210, or 310 as described with reference to FIGS. 1-3. Additionally, or alternatively, memory system controller 415 may be an example of memory system controller 115, 215, or 315 as described with reference to FIGS. 1 through 3. Additionally, or alternatively, block 420 may be an example of a block 170 or block 325 as described with reference to FIGS. 2 and 3.

In some examples, process flow 400 may correspond to one or more write operations performed at the memory system 410 and one or more erase operations performed at blocks 420, where the erase operations may be divided into one or more portions. Aspects of the process flow 400 may be implemented by the memory system controller 415, among other components. Additionally, or alternatively, aspects of the process flow 400 may be implemented as instructions stored in memory (e.g., firmware stored in a memory coupled with the memory system controller 415). For example, the instructions, in response to being executed by the memory system controller 415, may cause the memory system controller 415 to perform the operations of the process flow 400.

At 425, the memory system 410 may be operating in an idle mode. For example, the memory system controller 415 may identify that the memory system 410 is operating in an idle mode. In some examples, the memory system controller 415 may perform one or more background operations during the idle mode of the memory system 410.

At 430, signaling indicating to perform the first portion of the erase operation may be transmitted. For example, at 430, the memory system controller 415 may transmit signaling to the block 420 indicating to perform the first portion of the erase operation. In some examples, the memory system controller 415 may transmit the signaling to the block 420 in response to identifying that the memory system 410 is operating in an idle mode.

At 435, the first portion of the erase operation may be performed on block 420. For example, the block 420 may perform the first portion of the erase cycle operation in response to receiving the signaling from the memory system controller 415.

In some examples, the erase operation may include a quantity of erase cycles. As such, the block 420 may perform a first subset of the quantity of erase cycles as part of performing the first portion of the erase operation. For example, performing the first portion of the erase operation may include applying two or more pulses to the block 420, where each pulse of the two or more pulses may be associated with a first amplitude and a first width, and where a first subset of the data written to the block 420 may be erased in response to applying the two or more pulses.

In some examples, the quantity of erase cycles for the erase operation (e.g., N cycles) may be configured in response to the quantity of bits stored to at least one memory cell included in the block 420. For example, an erase operation for SLCs, MLCs, TLCs, and QLCs may be associated with applying a respective quantity of erase cycles for each type of memory cell.

At 440, a write command may be received. For example, the memory system controller 415 may receive a write command from the host system 405. In some examples, the write command may indicate to write data to the block 420 after performing the first portion of the erase operation.

At 445, the threshold voltage of block 420 may be determined. For example, in response to receiving the write command, the memory system controller 415 may determine whether a threshold voltage of the block 420 satisfies a threshold. If at 445, the memory system controller 415 determines that the threshold voltage of the block 420 fails to satisfy the threshold, then the memory system controller 415 may refrain from performing a second portion of the erase operation. In response to determining that the threshold voltage fails to satisfy the threshold, at 460, the memory system controller 415 may write data indicated by the write command to the block 420.

If at 445, the memory system controller 415 determines that the threshold voltage of the block 420 satisfies the threshold, then at 450 and 455, the second portion of the erase operation may be performed. For example, at 450, the memory system controller 415 may transmit signaling to the block 420 indicating to perform the second portion of the erase operation. In some examples, the memory system controller 415 may transmit the signaling to the block 420 in response to determining that the threshold voltage of the block 420 satisfies the threshold. At 455, the block 420 may perform the second portion of the erase cycle operation in response to receiving the signaling from the memory system controller 415.

In some examples, performing the second portion of the erase operation may include performing a second subset of the quantity of erase cycles. In some examples, performing the second subset of the quantity of erase cycles may include applying at least one pulse to the block 420, where the at least one pulse may be associated with a second amplitude and a second width. In some examples, the second amplitude and the second width may be determined in response to the value of the threshold voltage. In response to applying the two or more pulses, a second subset of the data written to the block 420 may be erased.

In some examples, the first amplitude for the first subset of erase cycles may be different than the second amplitude for the second subset of erase cycles. Additionally, or alternatively, the first width for the first subset of erase cycles may be different than the second width for the second subset of erase cycles. Additionally, or alternatively, one or more of the first amplitude, the first width, the second amplitude, and the second width may be determined in response to a quantity of bits stored to at least one memory cell included in the block 420.

At 460, data associated with the write command may be written to the block 420. For example, the memory system controller 415 may write the data to the block 420 in response to performing the second portion of the erase operation.

Performing the first portion of the erase operation during the idle duration of the memory system 410 may decrease the latency associated with performing the write operation. Additionally, or alternatively, performing the second portion of the erase operation in response to receiving the write command may decrease the frequency of erase operations, which may increase the endurance of the memory cells of the memory system 410.

Figure 5:
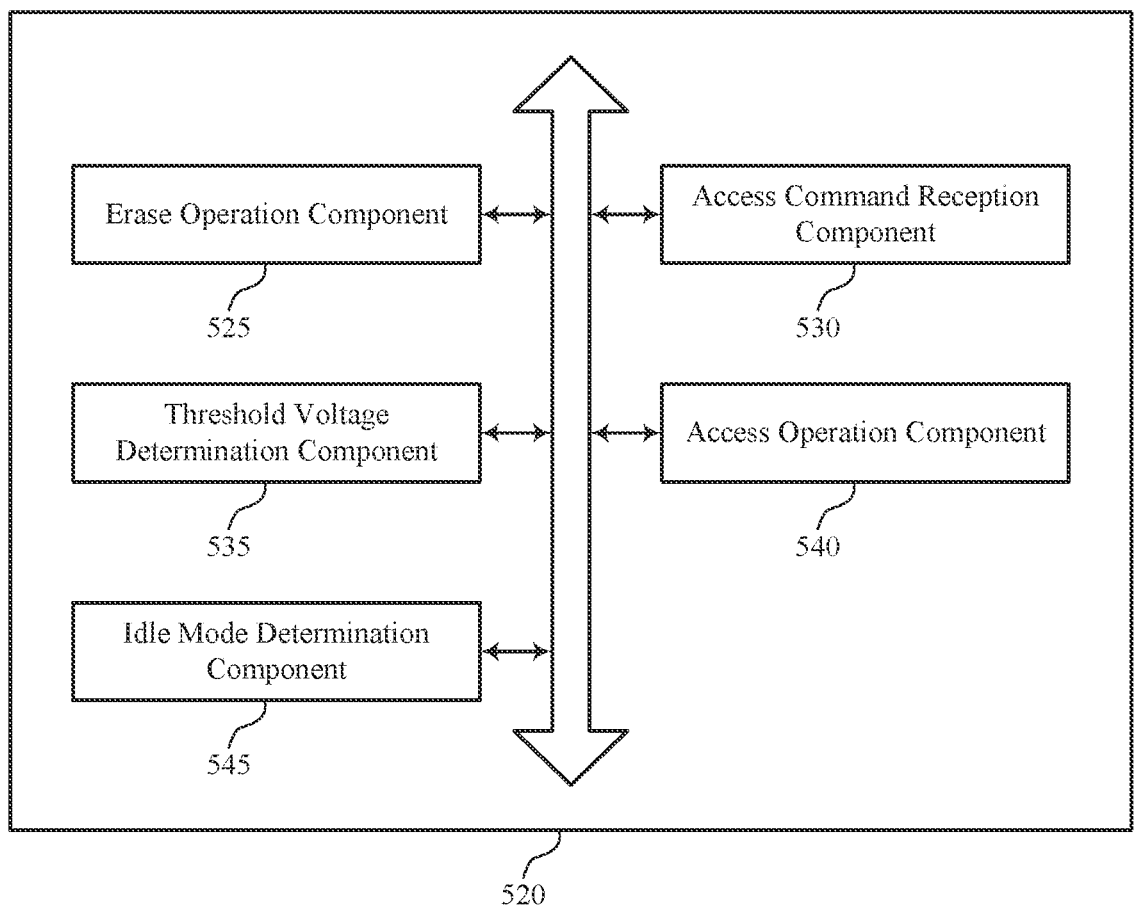
FIG. 5 illustrates a block diagram of a memory system that supports an erase operation for a memory system in accordance with examples as disclosed herein.

FIG. 5 illustrates a block diagram 500 of a memory system 520 that supports an erase operation for a memory system in accordance with examples as disclosed herein. The memory system 520 may be an example of aspects of a memory system as described with reference to FIGS. 1 through 4. The memory system 520, or various components thereof, may be an example of means for performing various aspects of an erase operation for a memory system as described herein. For example, the memory system 520 may include an erase operation component 525, an access command reception component 530, a threshold voltage determination component 535, an access operation component 540, an idle mode determination component 545, or any combination thereof. Each of these components may communicate, directly or indirectly, with one another (e.g., via one or more buses).

The erase operation component 525 may be configured as or otherwise support a means for performing, on a block of memory cells of a memory system, a first portion of an erase operation. The access command reception component 530 may be configured as or otherwise support a means for receiving a write command to write data to the block of memory cells after performing the first portion of the erase operation. The threshold voltage determination component 535 may be configured as or otherwise support a means for determining whether a threshold voltage of the block of memory cells satisfies a threshold in response to receiving the write command. In some examples, the erase operation component 525 may be configured as or otherwise support a means for performing, on the block of memory cells, a second portion of the erase operation in response to determining that the threshold voltage satisfies the threshold.

In some examples, the access operation component 540 may be configured as or otherwise support a means for writing the data to the block of memory cells in response to performing the second portion of the erase operation.

In some examples, the erase operation includes a plurality of erase cycles, and the erase operation component 525 may be configured as or otherwise support a means for performing a first subset of the plurality of erase cycles as part of performing the first portion of the erase operation. In some examples, the erase operation includes a plurality of erase cycles, and the erase operation component 525 may be configured as or otherwise support a means for performing a second subset of the plurality of erase cycles as part of performing the second portion of the erase operation.

In some examples, the erase operation includes the first subset of the plurality of erase cycles and the second subset of the plurality of erase cycles. In some examples, a quantity of the plurality of erase cycles is in accordance with a quantity of bits stored to at least one memory cell included in the block of memory cells.

In some examples, to support performing the first portion of the erase operation, the erase operation component 525 may be configured as or otherwise support a means for applying two or more pulses to the block of memory cells, where each pulse of the two or more pulses is associated with a first amplitude and a first width, and where a first subset of the data written to the block of memory cells is erased in response to applying the two or more pulses.

In some examples, to support performing the second portion of the erase operation, the access operation component 540 may be configured as or otherwise support a means for applying at least one pulse to the block of memory cells, where the at least one pulse is associated with a second amplitude and a second width, where the second amplitude and the second width are in accordance with a value of the threshold voltage, and where a second subset of the data written to the block of memory cells is erased in response to applying the two or more pulses.

In some examples, the first amplitude is different than the second amplitude, the first width is different than the second width, or both.

In some examples, one or more of the first amplitude, the first width, the second amplitude, and the second width are in accordance with a quantity of bits stored to at least one memory cell included in the block of memory cells.

In some examples, the erase operation component 525 may be configured as or otherwise support a means for refraining from performing the second portion of the erase operation in response to determining that the threshold voltage fails to satisfy the threshold. In some examples, the access operation component 540 may be configured as or otherwise support a means for writing the data to the block of memory cells in response to determining that the threshold voltage fails to satisfy the threshold.

In some examples, the idle mode determination component 545 may be configured as or otherwise support a means for determining that the memory system is operating in an idle mode, where performing the first portion of the erase operation is in response to determining that the memory system is operating in the idle mode.

Figure 6:
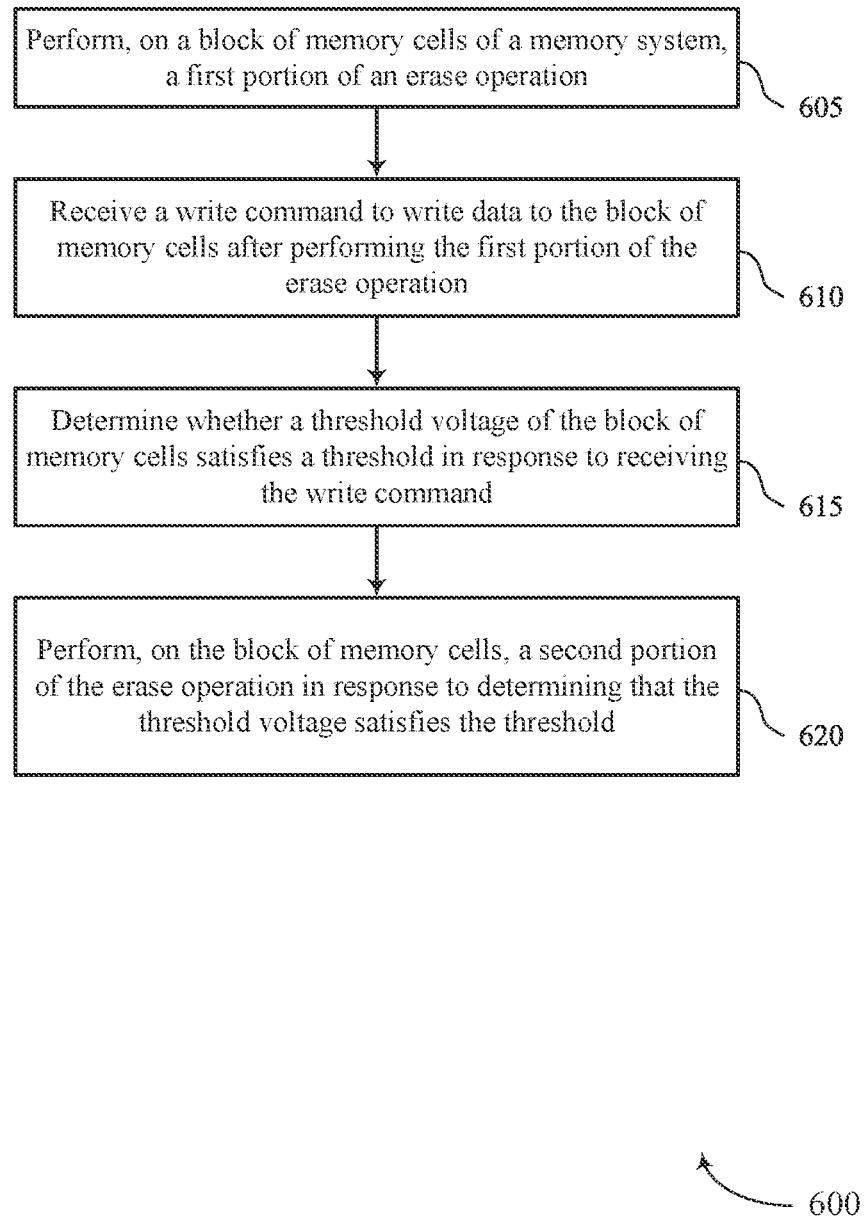
FIG. 6 illustrates a flowchart showing a method or methods that support an erase operation for a memory system in accordance with examples as disclosed herein.

FIG. 6 illustrates a flowchart showing a method 600 that supports an erase operation for a memory system in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include performing, on a block of memory cells of a memory system, a first portion of an erase operation. The operations of 605 may be performed in accordance with examples as disclosed herein. In some examples, aspects of the operations of 605 may be performed by an erase operation component 525 as described with reference to FIG. 5.

At 610, the method may include receiving a write command to write data to the block of memory cells after performing the first portion of the erase operation. The operations of 610 may be performed in accordance with examples as disclosed herein. In some examples, aspects of the operations of 610 may be performed by an access command reception component 530 as described with reference to FIG. 5.

At 615, the method may include determining whether a threshold voltage of the block of memory cells satisfies a threshold in response to receiving the write command. The operations of 615 may be performed in accordance with examples as disclosed herein. In some examples, aspects of the operations of 615 may be performed by a threshold voltage determination component 535 as described with reference to FIG. 5.

At 620, the method may include performing, on the block of memory cells, a second portion of the erase operation in response to determining that the threshold voltage satisfies the threshold. The operations of 620 may be performed in accordance with examples as disclosed herein. In some examples, aspects of the operations of 620 may be performed by an erase operation component 525 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for performing, on a block of memory cells of a memory system, a first portion of an erase operation, receiving a write command to write data to the block of memory cells after performing the first portion of the erase operation; determining whether a threshold voltage of the block of memory cells satisfies a threshold in response to receiving the write command, and performing, on the block of memory cells, a second portion of the erase operation in response to determining that the threshold voltage satisfies the threshold.

Aspect 2: The method, apparatus, or non-transitory computer-readable medium of aspect 1, further including operations, features, circuitry, logic, means, or instructions, or any combination thereof for writing the data to the block of memory cells based at least in part on performing the second portion of the erase operation.

Aspect 3: The method, apparatus, or non-transitory computer-readable medium of any of aspects 1 through 2, where the erase operation includes a plurality of erase cycles and the method, apparatuses, and non-transitory computer-readable medium further includes operations, features, circuitry, logic, means, or instructions, or any combination thereof for performing a first subset of the plurality of erase cycles as part of performing the first portion of the erase operation and performing a second subset of the plurality of erase cycles as part of performing the second portion of the erase operation.

Aspect 4: The method, apparatus, or non-transitory computer-readable medium of aspect 3, where the erase operation includes the first subset of the plurality of erase cycles and the second subset of the plurality of erase cycles and a quantity of the plurality of erase cycles is based at least in part on a quantity of bits stored to at least one memory cell included in the block of memory cells.

Aspect 5: The method, apparatus, or non-transitory computer-readable medium of any of aspects 1 through 4, where performing the first portion of the erase operation includes operations, features, circuitry, logic, means, or instructions, or any combination thereof for applying two or more pulses to the block of memory cells, where each pulse of the two or more pulses is associated with a first amplitude and a first width, and where a first subset of the data written to the block of memory cells is erased based at least in part on applying the two or more pulses.

Aspect 6: The method, apparatus, or non-transitory computer-readable medium of aspect 5, where performing the second portion of the erase operation includes operations, features, circuitry, logic, means, or instructions, or any combination thereof for applying at least one pulse to the block of memory cells, where the at least one pulse is associated with a second amplitude and a second width, where the second amplitude and the second width are based at least in part on a value of the threshold voltage, and where a second subset of the data written to the block of memory cells is erased based at least in part on applying the two or more pulses.

Aspect 7: The method, apparatus, or non-transitory computer-readable medium of aspect 6, where the first amplitude is different than the second amplitude, the first width is different than the second width, or both.

Aspect 8: The method, apparatus, or non-transitory computer-readable medium of any of aspects 6 through 7, where one or more of the first amplitude, the first width, the second amplitude, and the second width are based at least in part on a quantity of bits stored to at least one memory cell included in the block of memory cells.

Aspect 9: The method, apparatus, or non-transitory computer-readable medium of any of aspects 1 through 8, further including operations, features, circuitry, logic, means, or instructions, or any combination thereof for refraining from performing the second portion of the erase operation based at least in part on determining that the threshold voltage fails to satisfy the threshold and writing the data to the block of memory cells based at least in part on determining that the threshold voltage fails to satisfy the threshold.

Aspect 10: The method, apparatus, or non-transitory computer-readable medium of any of aspects 1 through 9, further including operations, features, circuitry, logic, means, or instructions, or any combination thereof for determining that the memos system is operating in an idle mode, where performing the first portion of the erase operation is based at least in part on determining that the memory system is operating in the idle mode.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit in response to the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and second condition or action may occur directly as a result of the previous condition or action occurring independent of whether other conditions or actions occur. In some examples, a first condition or action may be performed, and second condition or action may occur directly as a result of the previous condition or action occurring, such that no other intermediate conditions or actions occur between the earlier condition or action and the second condition or action, or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims. "or" as used in a list of items (for example, a list of items prefaced by a phrase such as "at least one of" or "one or more of") indicates an inclusive list such that, for example, a list of at least one of A. B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
    one or more memory devices comprising a block of memory cells; and
    processing circuitry associated with the memory system, wherein the processing circuitry is configured to cause the memory system to:
        perform, on the block of memory cells, a first portion of an erase operation;
        receive a write command to write data to the block of memory cells after performing the first portion of the erase operation;
        determine whether a threshold voltage of the block of memory cells satisfies a threshold based at least in part on receiving the write command, the threshold voltage corresponding to a read window for the block of memory cells; and
        perform, on the block of memory cells, a second portion of the erase operation based at least in part on determining that the threshold voltage satisfies the threshold and based at least in part on receiving the write command.

2. The memory system of claim 1, wherein the processing circuitry is further configured to cause the memory system to:
    write the data to the block of memory cells based at least in part on performing the second portion of the erase operation.

3. The memory system of claim 1, wherein the erase operation comprises a plurality of erase cycles, and the processing circuitry is further configured to cause the memory system to:
    perform a first subset of the plurality of erase cycles as part of performing the first portion of the erase operation; and
    perform a second subset of the plurality of erase cycles as part of performing the second portion of the erase operation.

4. The memory system of claim 3, wherein the erase operation comprises the first subset of the plurality of erase cycles and the second subset of the plurality of erase cycles, and a quantity of the plurality of erase cycles is based at least in part on a quantity of bits stored to at least one memory cell included in the block of memory cells.

5. The memory system of claim 1, wherein, to perform the first portion of the erase operation, the processing circuitry is configured to cause the memory system to:
    apply two or more pulses to the block of memory cells, wherein each pulse of the two or more pulses is associated with a first amplitude and a first width, and wherein a first subset of the data written to the block of memory cells is erased based at least in part on applying the two or more pulses.

6. The memory system of claim 5, wherein, to perform the second portion of the erase operation, the processing circuitry is configured to cause the memory system to:
    apply at least one pulse to the block of memory cells, wherein the at least one pulse is associated with a second amplitude and a second width, wherein the second amplitude and the second width are based at least in part on a value of the threshold voltage, and wherein a second subset of the data written to the block of memory cells is erased based at least in part on applying the at least one pulse.

7. The memory system of claim 6, wherein the first amplitude is different than the second amplitude, the first width is different than the second width, or both.

8. The memory system of claim 6, wherein one or more of the first amplitude, the first width, the second amplitude, and the second width are based at least in part on a quantity of bits stored to at least one memory cell included in the block of memory cells.

9. The memory system of claim 1, wherein the processing circuitry is further configured to cause the memory system to:
refrain from performing the second portion of the erase operation based at least in part on determining that the threshold voltage fails to satisfy the threshold; and
write the data to the block of memory cells based at least in part on determining that the threshold voltage fails to satisfy the threshold.

10. The memory system of claim 1, wherein the processing circuitry is further configured to cause the memory system to:
determine that the memory system is operating in an idle mode, wherein performing the first portion of the erase operation is based at least in part on determining that the memory system is operating in the idle mode.

11. A non-transitory computer-readable medium storing code comprising instructions which, when executed by processing circuitry of an electronic device, cause the electronic device to:
perform, on a block of memory cells of a memory system, a first portion of an erase operation;
receive a write command to write data to the block of memory cells after performing the first portion of the erase operation;
determine whether a threshold voltage of the block of memory cells satisfies a threshold based at least in part on receiving the write command, the threshold voltage corresponding to a read window for the block of memory cells; and
perform, on the block of memory cells, a second portion of the erase operation based at least in part on determining that the threshold voltage satisfies the threshold and based at least in part on receiving the write command.

12. The non-transitory computer-readable medium of claim 11, wherein the instructions, when executed by the processing circuitry of the electronic device, further cause the electronic device to:
write the data to the block of memory cells based at least in part on performing the second portion of the erase operation.

13. The non-transitory computer-readable medium of claim 11, wherein the erase operation comprises a plurality of erase cycles, the instructions, when executed by the processing circuitry of the electronic device, further cause the electronic device to:
perform a first subset of the plurality of erase cycles as part of performing the first portion of the erase operation; and
perform a second subset of the plurality of erase cycles as part of performing the second portion of the erase operation.

14. The non-transitory computer-readable medium of claim 13, wherein the erase operation comprises the first subset of the plurality of erase cycles and the second subset of the plurality of erase cycles, and a quantity of the plurality of erase cycles is based at least in part on a quantity of bits stored to at least one memory cell included in the block of memory cells.

15. The non-transitory computer-readable medium of claim 11, wherein the instructions to perform the first portion of the erase operation, when executed by the processing circuitry of the electronic device, further cause the electronic device to:
apply two or more pulses to the block of memory cells, wherein each pulse of the two or more pulses is associated with a first amplitude and a first width, and wherein a first subset of the data written to the block of memory cells is erased based at least in part on applying the two or more pulses.

16. The non-transitory computer-readable medium of claim 15, wherein the instructions to perform the second portion of the erase operation, when executed by the processing circuitry of the electronic device, further cause the electronic device to:
apply at least one pulse to the block of memory cells, wherein the at least one pulse is associated with a second amplitude and a second width, wherein the second amplitude and the second width are based at least in part on a value of the threshold voltage, and wherein a second subset of the data written to the block of memory cells is erased based at least in part on applying the at least one pulse.

17. The non-transitory computer-readable medium of claim 16, wherein the first amplitude is different than the second amplitude, the first width is different than the second width, or both.

18. The non-transitory computer-readable medium of claim 16, wherein one or more of the first amplitude, the first width, the second amplitude, and the second width are based at least in part on a quantity of bits stored to at least one memory cell included in the block of memory cells.

19. The non-transitory computer-readable medium of claim 11, wherein the instructions, when executed by the processing circuitry of the electronic device, further cause the electronic device to:
refrain from performing the second portion of the erase operation based at least in part on determining that the threshold voltage fails to satisfy the threshold; and
write the data to the block of memory cells based at least in part on determining that the threshold voltage fails to satisfy the threshold.

20. A method, comprising:
performing, on a block of memory cells of a memory system, a first portion of an erase operation;
receiving a write command to write data to the block of memory cells after performing the first portion of the erase operation;
determining whether a threshold voltage of the block of memory cells satisfies a threshold based at least in part on receiving the write command, the threshold voltage corresponding to a read window for the block of memory cells; and
performing, on the block of memory cells, a second portion of the erase operation based at least in part on determining that the threshold voltage satisfies the threshold and based at least in part on receiving the write command.

* * * * *